2

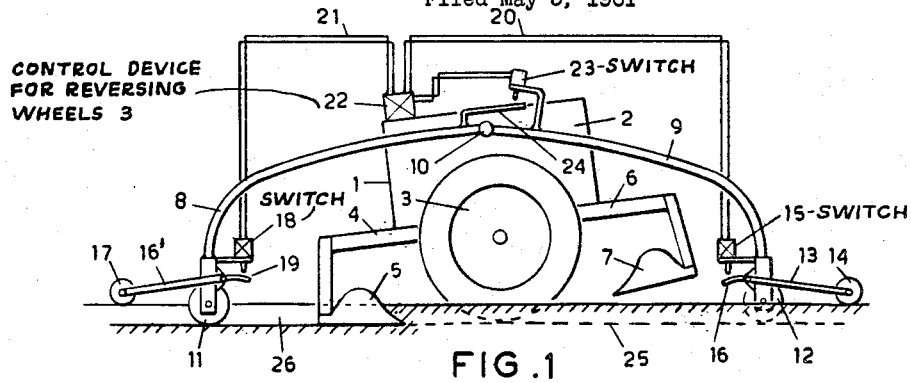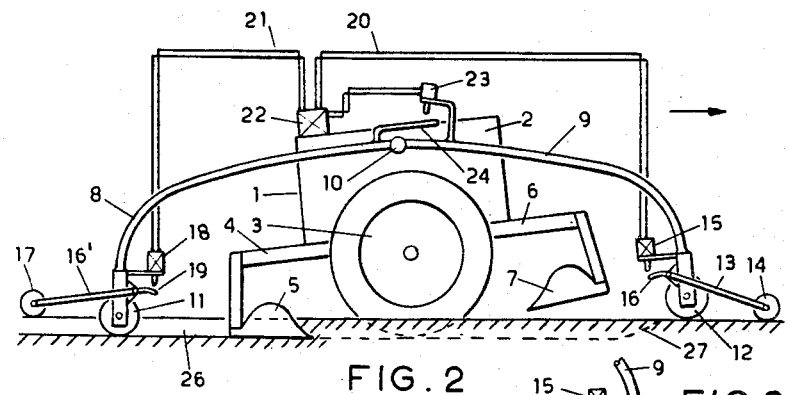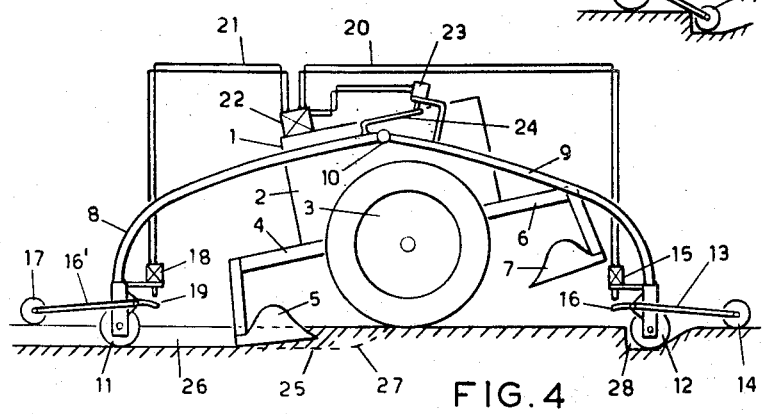

United States Patent Office 3,118,505
Patented Jan. 21, 1964

3,118,505
BASCULE OR TILTING-BEAM PLOW WITH AUTOMATIC STEERING AND STOPPING
Cornelis Sieling, Roxenisse 13, Melissant, Netherlands
Filed May 5, 1961, Ser. No. 108,029
Claims priority, application Netherlands May 10, 1960
6 Claims. (Cl. 172—6)

The invention relates to an automatic bascule, or tilting-beam plow, wherein a mobile chassis, which at its forward and its rear end has one or more plow bottoms alternately in operation, and the plow is provided with a separate driving mechanism, which plow is so constructed that it has the tendency of deviating from the furrow previously plowed and this deviation is counteracted by a wheel guided in the furrow finished last, means being provided for reversing the direction of driving the plow when reaching the end of the furrow plowed.

The invention has the object of providing very effective means for reversing the direction of driving the plow when reaching the end of the furrow plowed. These means have to meet special requirements because the land on which the plow is moving, has a very unequal surface so that there is a risk that eventual feelers or such are actuated at the wrong moment.

According to the invention an arm has been provided at the forward and at the rear end of the plow freely movable in the vertical direction relative to the plow chassis, each arm carrying a guide wheel, whereby the guide wheel lying at the same end as the non-operative plow bottom prevents the displacement, each arm being provided with an auxiliary arm being able to swing in a vertical plane and carrying at its free end an auxiliary wheel or such lying ahead of the guide wheel at a certain distance by the side of it in such a manner that when the guide wheel is running in the furrow finished last, the auxiliary wheel is running over the land not yet plowed, the auxiliary arm can swing downwards relative to the arm carrying the guide wheel to a position, in which the running surface of the auxiliary wheel lies lower than the running surface of the guide wheel and a switching device has been provided for operating the reversing device of the plow, which switching device is actuated in said last position of the auxiliary arm.

Owing to this construction in the normal position of the plow, when the auxiliary arm swings up and down, there is no risk that the switching device for reversing the direction of the plow will be actuated. It is now possible to plow at the end of the land to be plowed, a simple furrow which extends in transverse direction. When then at the end of the normal plow furrow the guide wheel leaves the furrow the switching device comes into a position in which it nearly can be actuated. As soon as the auxiliary wheel arrives in the transverse furrow, the switching device is actuated. When applying such a device it is desirable to have an additional safety device to prevent the plow from continuing its movement when the reversing means do not work. According to the invention one of the arms carrying the guide wheels has been provided with a switching device for stopping the plow, which device can be actuated by a cam attached to the other one of said arms, when one of said arms is in such a position that the running surface of the guide wheels of one of said arms lies at a certain distance below the common running surface of the other guide wheel and the supporting wheel.

In this way it is attained that when the guide wheel falls in the transverse furrow the plow is stopped. The same effect occurs when the guide wheel reaches the side of a ditch and moves downwards relative to the plow.

The invention is explained in more detail in the following description of an embodiment given by way of example with reference to the accompanying drawing, in which:

FIGURE 1 is a view of the plow according to the invention in the normal plowing position;
FIGURE 2 is a view of the plow just before the reversing of its direction will take place;
FIGURE 3 shows in detail the position of the auxiliary wheel at the moment that the reversing takes place;
FIGURE 4 shows the plow in a position in which it is stopped as the reversing of direction has not taken place, due to failure of the reversing device.

The plow 1 comprises an engine 2 and wheels 3. At the one end the plow shows a plow beam 4 with a plow bottom 5 and at the other end a plow beam 6 with a plow bottom 7. The plow as a whole is tiltable about the axis of the wheels 3 so that dependent on the direction of driving either the plow bottom 5 or the plow bottom 7 is operating. Arms 8 and 9 are articulated at 10 to each other and to the chassis of the plow. These arms 8 and 9 can swing in vertical direction. The arm 8 carries a guide wheel 11 and the arm 9 carries a guide wheel 12. Further at the free end of the arm 9 an auxiliary arm 13 with an auxiliary wheel 14 is attached. The arm 13 can swing free in vertical direction relative to the arm 9. The arm 13 lies at a certain distance by the side of the wheel 12. To the arm 9 a switch 15 is attached and with this switch a cam 16 carried by the auxiliary arm 13 can cooperate in a position in which the wheel 14 is lying lower than the wheel 12. The free end of the arm 8 shows a similar auxiliary arm 16' with an auxiliary wheel 17, a switch 18 and a camlike portion 19. The switches 15 and 18 are connected by means of cables 20 and 21 with an operating device 22 for the driving gear and the engine 2 of the plow. The switch 23 is attached to the arm 9 and a camlike portion 24 which belongs to the arm 8 can cooperate with the switch 23 in a position in which one of the guide wheels 11 or 12 lies below the running surface of the other guide wheel and the wheel 3.

Any conventional drive and reverse means may be used to operate the plow. For example, engine 2 may be mechanically connected by a reversible gear transmission to the wheels 3. Such a device is fully described in U.S. Patent 1,601,944, issued October 5, 1926. Alternatively, the engine 2 may be connected with a hydraulic pump which delivers fluid under pressure to two hydraulic motors each connected with one of the wheels 3. The operating device 22 may include any suitable electrical circuit for reversing and stopping the conventional drive such as electrical means for controlling an operating lever of said reversible gear transmission. It is obvious from the above that switches 18 and 15 each can close a contact to operate device 22 and thus reverse the drive.

Device 22 also may include a circuit element which when energized maintains the ignition circuit closed. The switch 23 breaks the circuit of said element to cut off the ignition.

When the plow is working as is shown in FIGURE 1, the plow has the tendency to deviate in transverse direction for example owing to the fact, that the wheels 3 have different diameters. This tendency is counteracted by the guide wheel 12 which is guided in the furrow finished last. The guide wheel 11 is then running in the furrow which is plowed at that moment. The wheel 14 is running over the land not yet plowed. In this position there is no risk that the cam 16 would contact the switch 15 when the land shows an unequal surface. When the guide wheel 12 reaches the end 27 of the furrow 25 this wheel leaves the furrow 25, so that the cam 16 approaches the switch 15 (FIGURE 2).

As the end of the land has been plowed an auxiliary wheel 14 reaches this furrow 28, the switch 15 is actuated and the direction of driving the plow is reversed (FIGURE 3).

When it should happen that the reversing device does not work, the guide wheel 12 arrives in the furrow 28 (FIGURE 4). When this occurs the switch 23 is actuated by the cam 24 and so the plow is stopped. Here a very effective safeguarding has been obtained.

What I claim is:

1. In an automatic bascule plow, including a mobile chassis, which at its forward and at its rear end has one or more plow bottoms alternately in operation, and a driving mechanism, said plow being so constructed that it has the tendency of deviating from the furrow previously plowed and this deviation is counteracted by a wheel guided in the furrow finished last, and means for reversing the direction of driving the plow when reaching the end of the furrow plowed, the improvements comprising an arm freely movable in the vertical direction relative to the plow chassis provided at the forward and at the rear end of the plow, each arm carrying a guide wheel lying at the same end as the non-operative plow bottom to prevent the displacement, each arm provided with an auxiliary arm being able to swing in a vertical plane and carrying at its free end an auxiliary wheel or the like lying ahead of the guide wheel at a certain distance by the side of it in such a manner that when the guide wheel is running in the furrow finished last, the auxiliary wheel is running over the land not yet plowed, so that the auxiliary arm relative to the arm carrying the guide wheel can swing downwards to a position in which the running surface of the auxiliary wheel lies lower than the running surface of the guide wheel, and a switching device for operating the reversing device of the plow, which switching device is actuated in said last position of the auxiliary arm.

2. In an automatic bascule plow the improvements according to claim 1, characterised in that one of the arms carrying the guide wheels has been provided with a switching device for stopping the plow, which device can be actuated by a cam attached to the other one of said arms, when one of said arms is in such a position that the running surface of the guide wheel of one of said arms lies at a certain distance below the common running surface of the other guide wheel and the supporting wheel.

3. In an automatic bascule plow of the reversing type so constructed and having support wheels such as to provide the tendency of deviating from a previously plowed furrow, which deviation is counteracted by a wheel guided in the last finished furrow, said plow including a mobile chassis which at each of its forward and rear ends has one or more plow shares alternately in operation, a plow driving mechanism, and means for reversing the direction of driving the plow when reaching the end of a furrow, the improvements comprising an arm at each end of the plow mounted to be freely movable in vertical directions, each said arm carrying a guide wheel effective for preventing said deviation of the plow when the plow is driven in a direction away from said wheel, an auxiliary arm swingably mounted to move in a vertical plane on each of said arms, each auxiliary arm carrying an auxiliary wheel beyond and to one side of the associated guide wheel, and a switching device operable to control said plow reversing means carried by each arm and co-operating auxiliary arm and actuated when said auxiliary wheel drops to a running surface lower than that of the associated guide wheel.

4. In an automatic bascule plow the combination according to claim 3 wherein said pair of arms respectively carry a switch and an actuating member, said switch being operable to stop the plow when the surface contacted by one guide wheel is below a plane containing the bottoms of the other guide wheel and the plow support wheels.

5. In an automatic plow of the reversing type including a mobile chassis, a plow driving mechanism, and means for reversing the direction of driving the plow, the improvements comprising an arm at one end of the plow mounted to be freely movable in vertical directions, said arm carrying a guide member, an auxiliary arm swingably mounted to move in a vertical plane on said arm and carrying an auxiliary guide member beyond and to one side of the associated guide member, and a switching device operable to control said plow reversing means carried by said arms and actuated when said auxiliary guide member drops to a surface lower than that of the associated guide member.

6. In an automatic plow of the reversing type including a mobile chassis, a plow driving mechanism, and means for stopping the driving of the plow, the improvements comprising an arm at each end of the plow mounted to be freely movable in vertical directions, said arms each carrying a ground contacting guide member, and a switching device operable to actuate said means to stop said plow carried by said arms and actuated by movement thereof to one of a pair of selected undesired relative positions.

References Cited in the file of this patent

UNITED STATES PATENTS

| 1,291,969 | McFarland | Jan. 21, 1919 |
| 1,457,647 | Avera | June 5, 1923 |
| 1,601,944 | Davidson | Oct. 5, 1926 |

FOREIGN PATENTS

| 9,122 | Great Britain | of 1914 |